(12) United States Patent
Achar et al.

(10) Patent No.: US 11,538,100 B2
(45) Date of Patent: Dec. 27, 2022

(54) NEURAL NETWORK BASED PREDICTION OF COMPETITION BEHAVIOUR IN ENERGY MARKETS

(71) Applicant: Tata Consultancy Services Limited, Mumbai (IN)

(72) Inventors: Avinash Achar, Chennai (IN); Abhay Pratap Singh, Sagar (IN); Venkatesh Sarangan, Chennai (IN); Akshaya Natarajan, Chennai (IN); Easwara Subramanian, Hyderabad (IN); Sanjay Purushottam Bhat, Hyderabad (IN); Yogesh Bichpuriya, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 295 days.

(21) Appl. No.: 16/827,800

(22) Filed: Mar. 24, 2020

(65) Prior Publication Data

US 2021/0019821 A1    Jan. 21, 2021

(30) Foreign Application Priority Data

Jun. 11, 2019 (IN) .............................. 201921023159

(51) Int. Cl.
*G06Q 30/00* (2012.01)
*G06Q 30/08* (2012.01)
(Continued)

(52) U.S. Cl.
CPC ........... *G06Q 30/08* (2013.01); *G06K 9/6215* (2013.01); *G06K 9/6263* (2013.01);
(Continued)

(58) Field of Classification Search
CPC ................................................... G06Q 30/08
(Continued)

(56) References Cited

U.S. PATENT DOCUMENTS 11,055,732 B2 * 7/2021 Sun ........................ H02J 3/466
2014/0310059 A1    10/2014 Ellis et al.
(Continued)

OTHER PUBLICATIONS

Decision-Making for Electricity Retailers: A Brief Survey. Published in: IEEE Transactions on Smart Grid (vol. 9, Issue: 5, pp. 4140-4153) Authors: Jiajia Yang • Junhua Zhao • Fengji Luo • Fushuan Wen • Zhao Yang Dong (Year: 2017).*

(Continued)

*Primary Examiner* — Bruce I Ebersman
*Assistant Examiner* — John A Anderson
(74) *Attorney, Agent, or Firm* — Finnegan, Henderson, Farabow, Garrett & Dunner LLP

(57) ABSTRACT

Sum of bid quantities (across price bands) placed by generators in energy markets have been observed to be either constant OR varying over a few finite values. Several researches have used simulated data to investigate desired aspect. However, these approaches have not been accurate in prediction. Embodiments of the present disclosure identified two sets of generators which needed specialized methods for regression (i) generators whose total bid quantity (TBQ) was constant (ii) generators whose total bid quantity varied over a few finite values only. In first category, present disclosure used a softmax output based ANN regressor to capture constant total bid quantity nature of targets and a loss function while training to capture error most meaningfully. For second category, system predicts total bid quantity (TBQ) of a generator and then predicts to allocate TBQ predicted across the various price bands which is accomplished by the softmax regression for constant TBQs.

18 Claims, 7 Drawing Sheets

(51) Int. Cl.
    *G06K 9/62*         (2022.01)
    *G06N 3/04*         (2006.01)
    *G06N 3/08*         (2006.01)

(52) U.S. Cl.
    CPC ......... *G06N 3/0445* (2013.01); *G06N 3/0454* (2013.01); *G06N 3/0472* (2013.01); *G06N 3/08* (2013.01)

(58) Field of Classification Search
    USPC .......................................................... 705/37
    See application file for complete search history.

(56) References Cited

U.S. PATENT DOCUMENTS

| | | | |
|---|---|---|---|
| 2017/0200229 A1* | 7/2017 | Price | G06Q 40/04 |
| 2018/0204111 A1* | 7/2018 | Zadeh | G06N 3/0436 |
| 2020/0082422 A1* | 3/2020 | Sun | H02J 3/466 |

OTHER PUBLICATIONS

Electricity price short-term forecasting using artificial neural networks. Published in: IEEE Transactions on Power Systems (vol. 14, Issue: 3, pp. 851-857) Authors: B.R. Szkuta • L.A. Sanabria • T.S. Dillon (Year: 1999).*

Gao, C et al. "Bidding Strategy with Forecast Technology Based on Support Vector Machine in Electricity Market," *APFA 6—Applications of Physics in Financial Analysis 6th International Conference*, Jul. 4-7, 2007, Lisbon, Portugal; 8 pages.

* cited by examiner

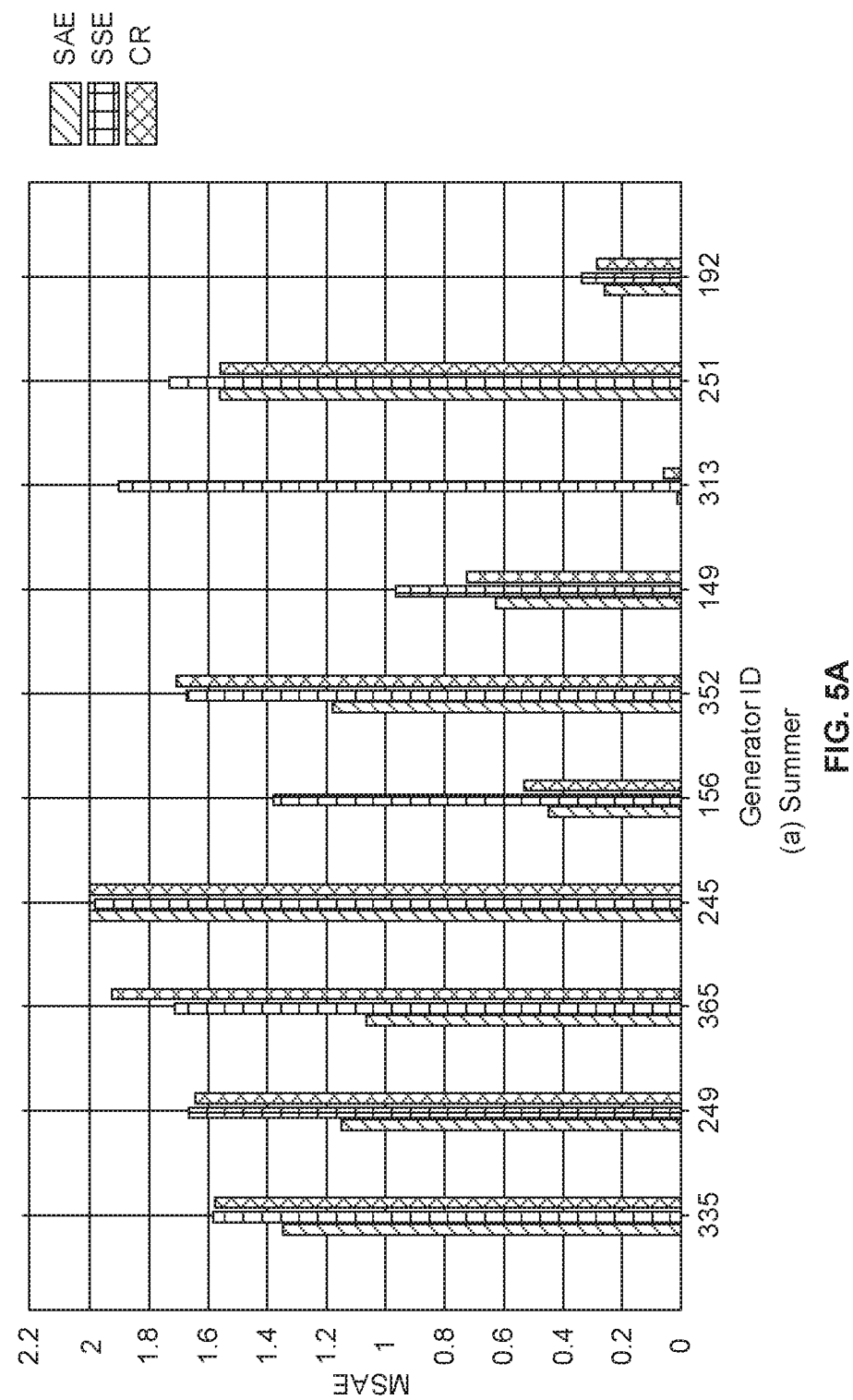

NEURAL NETWORK BASED PREDICTION OF COMPETITION BEHAVIOUR IN ENERGY MARKETS

PRIORITY CLAIM

This U.S. patent application claims priority under 35 U.S.C. § 119 to Indian Application No. 201921023159, filed on Jun. 11, 2019. The entire contents of the aforementioned application are incorporated herein by reference.

TECHNICAL FIELD

The disclosure herein generally relates to prediction techniques, and, more particularly, to neural network based prediction of competition behavior in energy markets.

BACKGROUND

The aim of deregulating the electricity industry ecosystem is to encourage competition so that the end consumer benefits from the resulting efficiency. An important outcome of deregulation is the creation of markets for a variety of services such as wholesale energy, balancing, and ancillary, to name a few. In whole-sale energy markets, bulk generating companies and retail energy suppliers come together to sell and buy energy respectively. The market activities are executed by a market operator in association with a transmission system operator. The overall market operation is overseen by a regulator.

In such whole-sale energy markets, different participants have their own objectives to optimize. The bulk generators are interested in maximizing their own individual profits while the retail energy suppliers aim to reduce their energy purchase price. Market operators strive to ease the process of trading and make it attractive so that the trade volume increases. System operators maintain feasibility and reliability in network operations. Regulators typically watch out for any gaming by the participating buyers and/or sellers that can derail the overall social good.

Such whole-sale energy markets exist in many countries around the world including Australia, UK, Europe, and USA. These markets can be considerably big. For instance, Australia's National Electricity Market typically serves more than 200 TWh of electricity annually to end consumers. More than $16 billion of electricity is traded annually to meet the demand of more than nine million customers as per the researcher's report.

Given the economic and operational significance of whole-sale energy markets, several research works have studied them under a variety of settings. These studies have employed techniques such as operations research, game theory, and machine learning to investigate various facets of energy markets such as existence of Nash equilibria, impact of market rationing policies, profit maximization for generators, and bid pricing rules, to name a few. While the contributions of these works are significant, they involve one or more simplistic assumptions including: (i) demand remaining constant over time, (ii) the energy output of a generator remaining constant over time, (iii) a generator picking only a single price to bid all its output, and (iv) generators placing a bid only for the next time slot. Further, many of these works use simulated data as the means to investigate their desired aspect. However, these approaches may not be accurate and are prone to error in terms of prediction.

SUMMARY

Embodiments of the present disclosure present technological improvements as solutions to one or more of the above-mentioned technical problems recognized by the inventors in conventional systems. For example, in one aspect, there is provided a processor implemented method for predicting competition behaviour in energy markets. The method comprises receiving in a neural network, via one or more hardware processors, an input request to predict a plurality of bid quantities of one or more energy generators for a given time slot and a given day of a particular week; obtaining historical information across a pre-defined time period corresponding to the one or more energy generators, the historical information comprising a demand, a clearing price, number of bids placed by the one or more energy generators, and an actual quantity of generation cleared by a market operator for the one or more energy generators, wherein the historical information is arranged as (i) a target bid of the given time slot and the given day of the given week and (ii) information for prediction specific to the one or more energy generators for the given time slot of (a) a previous day, and (b) same day of a relative previous week with reference to the given day of the given week; training the neural network, via the one or more hardware processors, using (i) a feedforward structure with softmax output layer, (ii) the rearranged historical information, and (iii) a sum absolute error loss employed with the one or more energy generators, to obtain a learnt set of weights; receiving for prediction of bid quantity of one or more energy generators, most recent data pertaining to the given time slot of the given day of the particular week, wherein the most recent data comprises demand, clearing price, number of bids placed by of the one or more energy generators, and cleared quantity of the one or more energy generators; and applying the learnt set of weights on the most recent data to predict a set of fractional bids associated with the one or more energy generators for the given time slot of the given day of the particular week.

In an embodiment, the sum absolute error loss is obtained based on (i) a target bid of the given day of the particular week by each of the one or more energy generators and (ii) an output generated by the neural network, and wherein the output is based on a current configuration of the neural network and one or more weights assigned to one or more layers in the neural network.

In an embodiment, the method further estimates an actual bid of each of the one or more energy generators based on the set of fractional bids and a total bid quantity associated with each corresponding energy generator.

In an embodiment, the method further predicts how a chosen bid quantity is distributed in a 'n' price bands by receiving, via a fractional bid predictor, the information for prediction specific to the one or more energy generators for the given time slot of (a) a previous day, and (b) same day of a relative previous week with reference to the given day of the given week, for predicting a fraction of a total bids made by each energy generator; predicting a total bid quantity based on (i) the information for prediction specific to the one or more energy generators for the given time slot of (a) a previous day, and (b) same day of a relative previous week with reference to the given day of the given week, and (ii) distance between a priori known total bids quantity values and predicting a final set of bids based on the pre-computed fraction of total bids and the total bid quantity.

In another aspect, there is provided a system for predicting competition behavior in energy markets. The system comprises a memory storing instructions, a neural network, one or more predictors comprising at least a fraction bid predictor and a total bid quantity predictor; one or more communication interfaces; and one or more hardware processors coupled to the memory via the one or more communication interfaces, wherein the one or more hardware processors are configured by the instructions to: process in the neural network, an input request to predict a plurality of bid quantities of one or more energy generators for a given time slot and a given day of a particular week; obtain historical information across a pre-defined time period corresponding to the one or more energy generators, the historical information comprising a demand, a clearing price, number of bids placed by the one or more energy generators, and an actual quantity of generation cleared by a market operator for the one or more energy generators, wherein the historical information is arranged as (i) a target bid of the given time slot and the given day of the given week and (ii) information for prediction specific to the one or more energy generators for the given time slot of (a) a previous day, and (b) same day of a relative previous week with reference to the given day of the given week; train the neural network using (i) a feedforward structure with softmax output layer of the neural network, (ii) the rearranged historical information, and (iii) a sum absolute error loss employed with the one or more energy generators, to obtain a learnt set of weights; receive for prediction of bid quantity of one or more energy generators, most recent data pertaining to the given time slot of the given day of the particular week, wherein the most recent data comprises demand, clearing price, number of bids placed by of the one or more energy generators, and cleared quantity of the one or more energy generators; and apply the learnt set of weights on the most recent data to predict a set of fractional bids associated with the one or more energy generators for the given time slot of the given day of the particular week.

In an embodiment, the sum absolute error loss is obtained based on (i) a target bid of the given day of the particular week by each of the one or more energy generators and (ii) an output generated by the neural network, and wherein the output is based on a current configuration of the neural network and one or more weights assigned to one or more layers in the neural network.

In an embodiment, the one or more hardware processors are further configured by the instructions to estimate an actual bid of each of the one or more energy generators based on the set of fractional bids and a total bid quantity associated with each corresponding energy generator.

In an embodiment, the one or more hardware processors are further configured by the instructions to predict how a chosen bid quantity is distributed in a 'n' price bands by receiving, via a fractional bid predictor comprised in the memory, the information for prediction specific to the one or more energy generators for the given time slot of (a) a previous day, and (b) same day of a relative previous week with reference to the given day of the given week, for predicting a fraction of a total bids made by each energy generator; predict via the total bid quantity predictor, a total bid quantity based on (i) the information for prediction specific to the one or more energy generators for the given time slot of (a) a previous day, and (b) same day of a relative previous week with reference to the given day of the given week, and (ii) distance between a priori known total bids quantity values; and predict a final set of bids based on a pre-computed fraction of total bids and the total bid quantity.

In yet another aspect, there are provided one or more non-transitory machine readable information storage mediums comprising one or more instructions which when executed by one or more hardware processors cause predicting competition behaviour in energy markets by receiving in a neural network, via one or more hardware processors, an input request to predict a plurality of bid quantities of one or more energy generators for a given time slot and a given day of a particular week; obtaining historical information across a pre-defined time period corresponding to the one or more energy generators, the historical information comprising a demand, a clearing price, number of bids placed by the one or more energy generators, and an actual quantity of generation cleared by a market operator for the one or more energy generators, wherein the historical information is arranged as (i) a target bid of the given time slot and the given day of the given week and (ii) information for prediction specific to the one or more energy generators for the given time slot of (a) a previous day, and (b) same day of a relative previous week with reference to the given day of the given week; training the neural network, via the one or more hardware processors, using (i) a feedforward structure with softmax output layer, (ii) the rearranged historical information, and (iii) a sum absolute error loss employed with the one or more energy generators, to obtain a learnt set of weights; receiving for prediction of bid quantity of one or more energy generators, most recent data pertaining to the given time slot of the given day of the particular week, wherein the most recent data comprises demand, clearing price, number of bids placed by of the one or more energy generators, and cleared quantity of the one or more energy generators; and applying the learnt set of weights on the most recent data to predict a set of fractional bids associated with the one or more energy generators for the given time slot of the given day of the particular week.

In an embodiment, the sum absolute error loss is obtained based on (i) a target bid of the given day of the particular week by each of the one or more energy generators and (ii) an output generated by the neural network, and wherein the output is based on a current configuration of the neural network and one or more weights assigned to one or more layers in the neural network.

In an embodiment, the instructions which when executed by the one or more hardware processors further cause estimating an actual bid of each of the one or more energy generators based on the set of fractional bids and a total bid quantity associated with each corresponding energy generator.

In an embodiment, the instructions which when executed by the one or more hardware processors further cause predicting how a chosen bid quantity is distributed in a 'n' price bands by receiving, via a fractional bid predictor, the information for prediction specific to the one or more energy generators for the given time slot of (a) a previous day, and (b) same day of a relative previous week with reference to the given day of the given week, for predicting a fraction of a total bids made by each energy generator; predicting a total bid quantity based on (i) the information for prediction specific to the one or more energy generators for the given time slot of (a) a previous day, and (b) same day of a relative previous week with reference to the given day of the given week, and (ii) distance between a priori known total bids quantity values and predicting a final set of bids based on the pre-computed fraction of total bids and the total bid quantity.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A-5B depict graphical presentations illustrating Mean Sum Absolute Error comparison of the SAE loss of the present disclosure versus Sum Squared Error (SSE) and Cross Entropy (CE), in accordance with an embodiment of the present disclosure.

DETAILED DESCRIPTION

Figure 1:
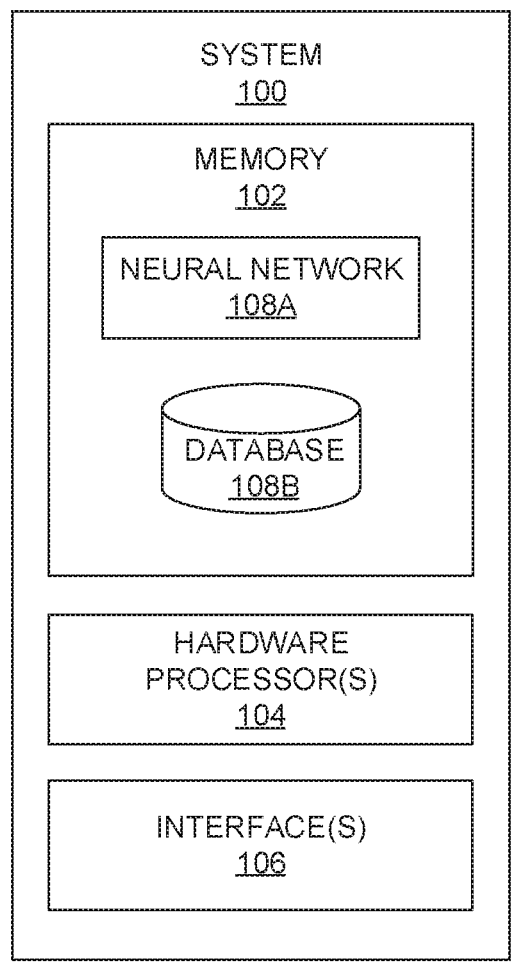
FIG. 1 illustrates an exemplary block diagram of a system for predicting competition behavior in energy markets, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods that implement neural network (or artificial neural network—ANN) for predicting competition behavior in energy markets. From the bidding agent's perspective, building predictive models of bidding behavior of competing agents can be pretty useful. In particular, this can aid us in building a complete simulator of the market from the bidding agent's perspective. The bidding agent can now in principle interact with this simulator for a sufficient no of epochs and learn an optimal bidding rule. Embodiments of the present disclosure utilize the available historical data of all competing agents to build the respective predictive models.

A close inspection of the historical bids revealed interesting structure like (a) the total bidding quantity being almost same OR (b) the total bid quantity varying between a few finite set of bids, for most of the generators. Present disclosure intelligently exploits this structure in designing suitably appropriate supervised learning models and illustrate their superior performance over standard baseline regression models.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 illustrates an exemplary block diagram of a system 100 for predicting competition behavior in energy markets, in accordance with an embodiment of the present disclosure. The system 100 may also be referred as 'prediction system' or 'neural network based prediction system' and may be interchangeably used hereinafter. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a neural network 108A and a database 108B are comprised in the memory 102, wherein the database 108B may comprise information, for example, historical data (e.g., past history pertaining to a specific time period—say for data of last 8 months), learnt weights during training of the neural network 108A, generators information such as generators ID, demand, clearing price, number of bids placed by one or more energy generators, an actual quantity of generation cleared by an energy entity (e.g., energy market) of the one or more energy generators, and the like. In an embodiment, the memory 102 may store (or stores) one or more techniques(s) (e.g., e.g., predictors such as fraction bid predictor, total bid quantity predictor, and the like), and the like. The above techniques which when executed by the one or more hardware processors 104 perform the methodology described herein. The memory 102 further comprises (or may further comprise) information pertaining to input(s)/output(s) of each step performed by the systems and methods of the present disclosure. More specifically, information pertaining to training of neural network 108A, learnt set of weights, how learnt weights are applied on most recent data, and the like, may be stored in the memory 102. In other words, input(s) fed at each step and output(s) generated at each step are comprised in the memory 102, and can be utilized in further processing and analysis.

Figure 2:
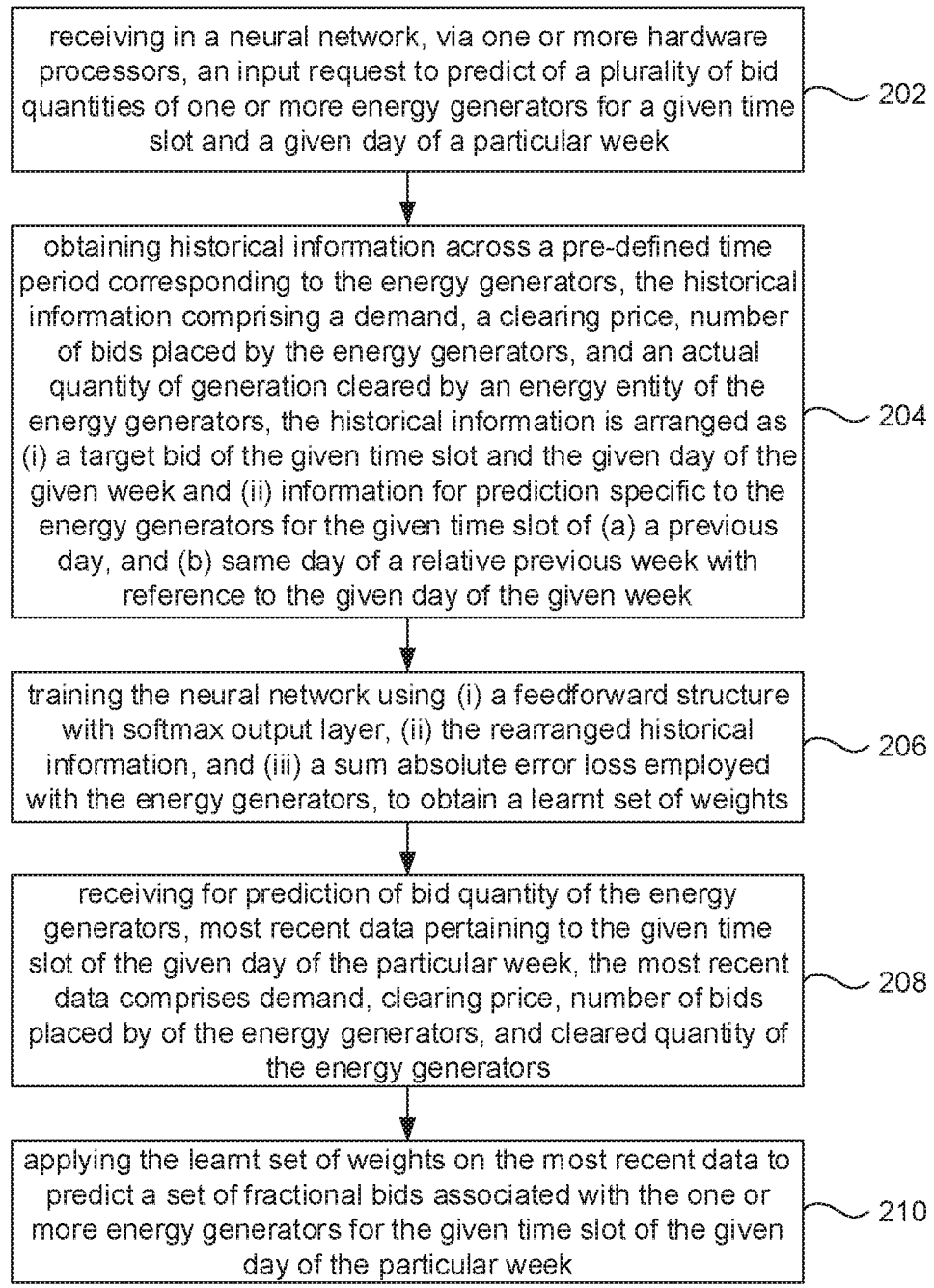
FIG. 2 is an exemplary flow diagram illustrating a method for predicting competition behavior in energy markets using the system of FIG. 1, in accordance with an embodiment of the present disclosure.

FIG. 2, with reference to FIG. 1, is an exemplary flow diagram illustrating a method for predicting competition behavior in energy markets using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, exemplary narrative text of FIG. 1 and the flow diagram as depicted in FIG. 2. In an embodiment of the present disclosure, at step 202, the neural network 108A receives, via one or more hardware processors, an input request to predict a plurality of bid quantities of one or more energy generators for a given time slot and a given day of a particular week. In an embodiment, all generators in the energy market are supposed to place their bids in 10 buckets, where each bucket (band) i is associated with a per-unit price $P_i$. The per-unit price $P_i$ at each band is typically fixed for each generator while the generators mainly play around with the bid quantity placed at each of these 10 bands. Note that the price $P_i$ even though fixed for each generator can be different from generator to generator. This means the bid prediction problem can be simplified to estimating only the 10 bid quantities placed at each price band.

So referring back to steps of FIG. 2, upon receiving the input request, at step 204, the one or more hardware processors 104 obtain historical information across a predefined time period corresponding to the one or more energy generators, the historical information comprising a demand, a clearing price, number of bids placed by the one or more energy generators, and an actual quantity of generation cleared by a market operator for the one or more energy generators, wherein the historical information is arranged as (i) a target bid of the given time slot and the given day of the given week and (ii) information for prediction specific to the one or more energy generators for the given time slot of (a) a previous day, and (b) same day of a relative previous week with reference to the given day of the given week. In other words, say, for the above give example, i.e., to estimate or predict the 10 bid quantities of a generator at a given block and day, the choice of inputs can be flexible. Since the predictions typically have to be done a day ahead, the bid information from the previous blocks of the day of prediction are not available. If it is to be predicted for a block i on a particular day, a simple choice of inputs could be all information of the same generator from (a) previous day of the same block i (b) same day of the previous week. The information at each block includes, but not limited to, (1) Demand, (2) Spot price (Clearing price), (3) 10 bids placed and cleared quantity of the associated generator, and the like as described above. In the present disclosure, clearing price refers to a per unit price that the market operator provides to generator whose bids have been cleared. Below are sample training values of the above historical information pertaining to predicted fractional bids and total bid quantity:

Below Table 1 depicts training set values as used by the present disclosure assuming that the date of prediction is Wednesday Jun. 8, 2016:

TABLE 1

| Generator | Feature | Date | Block | Spot | Regional | GCQ | TBQ | Fractional bids |
|---|---|---|---|---|---|---|---|---|
| 149 | Previous day | 2016 Jun. 07 | 27 | 32.83 | 1148 | 61.64579 | 65 | 0 |
| | | | | | | | | 0.07692308 |
| | | | | | | | | 0.89230769 |
| | | | | | | | | 0 |
| | | | | | | | | 0 |
| | | | | | | | | 0 |
| | | | | | | | | 0 |
| | | | | | | | | 0 |
| 149 | Same day of previous | 2016 Jun. 01 | 27 | 143.38 | 1163 | 58.36919 | 65 | 0 |
| | | | | | | | | 0.07692308 |
| | | | | | | | | 0 |
| | | | | | | | | 0 |
| | | | | | | | | 0 |
| | | | | | | | | 0 |
| | | | | | | | | 0.09230769 |
| | | | | | | | | 0 |
| 149 | Target | 2016 Jun. 08 | | | | 1066 | | |

Below Table 2 depicts individual bid across 10 price bands:

TABLE 2

| Individual bid across 10 price bands | | | | | | | | | | Total |
|---|---|---|---|---|---|---|---|---|---|---|
| 0 | 5 | 28 | 0 | 0 | 0 | 0 | 0 | 30 | 2 | 65 |

Below Table 3 depicts normalized values individual bid across 10 price bands that shows error:

TABLE 3

| Normalized values of the above individual bid across 10 price bands | | | | | | | | | |
|---|---|---|---|---|---|---|---|---|---|
| 0 | 0.076923 | 0.430769 | 0 | 0 | 0 | 0 | 0 | 0.46153 | 0.0307069 |

Below Table 4 depicts computation of fractional bids as per FIG. 3:

TABLE 4

Generators with variation in bids:

| Generator | Feature | Date | Block | Spot | Regional | GCQ | TBQ | Fractional bids |
|---|---|---|---|---|---|---|---|---|
| 244 | Previous day | 2016 Jun. 27 | 16 | 78.46 | 7853 | 66.39525 | 147 | 0 |
|  |  |  |  |  |  |  |  | 0 |
|  |  |  |  |  |  |  |  | 0.45578 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
| 244 | Same day of previous | 2016 Jun. 21 | 16 | 58.12 | 8172 | 30.7 | 111 | 0 |
|  |  |  |  |  |  |  |  | 0.27928 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
| 244 | Target | 2016 June |  |  | 8006 |  |  |  |

Below Table 5 depicts individual bid across 10 price bands:

TABLE 5

| Individual bid across 10 price bands | | | | | | | | | | Total |
|---|---|---|---|---|---|---|---|---|---|---|
| 0 | 31 | 0 | 0 | 0 | 0 | 0 | 0 | 49 | 80 | 160 |

Below Table 6 depicts normalized values of the above individual bid across 10 price bands:

TABLE 6

| Normalized values of above individual bid across 10 price bands-fractional bids | | | | | | | | | |
|---|---|---|---|---|---|---|---|---|---|
| 0 | 0.19375 | 0 | 0 | 0 | 0 | 0 | 0 | 0.6125 | 0.5 |

Below Table 7 depicts training set values where the target is not price band and target is total bid quantity:

TABLE 7

| Generator | Feature | Date | Block | Spot | Regional | GCQ | TBQ | Fractional bids |
|---|---|---|---|---|---|---|---|---|
| 244 | Previous day | 2016 Jun. 27 | 16 | 78.46 | 7853 | 66.39525 | 147 | 0 |
|  |  |  |  |  |  |  |  | 0.45578 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
| 244 | Same day of previous | 2016 Jun. 21 | 16 | 58.12 | 8172 | 30.7 | 111 | 0 |
|  |  |  |  |  |  |  |  | 0.27928 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
|  |  |  |  |  |  |  |  | 0 |
| 244 | Target | 2016 June |  |  | 8006 |  |  |  |

Total bid quantity: 147

In the above tables, GCQ refers to actual quantity of generation cleared by a market operator for the one or more energy generators.

Upon obtaining the historical information, at step 206, the one or more hardware processors 104 train the neural network 108A using (i) a feedforward structure with softmax output layer of the neural network 108A, (ii) the rearranged historical information, and (iii) a sum absolute error loss employed with the one or more energy generators. Upon training the neural network 108A, a learnt set of weights is obtained. In the present disclosure, the sum absolute error loss is obtained based on (i) a target bid of the given day of the particular week by each of the one or more energy generators and (ii) an output generated by the neural network 108A. The output is based on a current configuration of the neural network 108A and one or more weights assigned to one or more layers in the neural network 108A.

At step 208, the system 100 receives most recent data pertaining to the given time slot of the given day of the particular week, the most recent data comprises demand, clearing price, number of bids placed by of the one or more energy generators, and cleared quantity of the one or more energy generators. In the present disclosure the most recent data is received for prediction of bid quantity of one or more energy generators. At step 210, the learnt set of weights are applied on the most recent data by the system 100 to predict a set of fractional bids associated with the one or more energy generators for the given time slot of the given day of the particular week. 'Fractional bids' refers to bids distributed among a plurality of price bands (e.g., 10 price bands). For energy generator(s) where total bid quantity is a constant in the historical log (or the historical information), the system 100 does not predict the total bid quantities, rather predicts the fraction bids of each energy generator by utilizing the information of the total bid quantities.

Upon predicting the fractional bids, the system 100 further estimates an actual bid of each of the one or more energy generators based on the set of fractional bids and a total bid quantity associated with each corresponding energy generator. In a nutshell, say, if the prediction of fractional bids is for June (e.g., say 11th Jun., 2019), and assuming that the neural network 108A/the system 100 would have undergone training using previous 3 months' data (e.g., suppose the neural network 108A/system 100 is trained from start of March 2019 till May 31, 2019 using historical information that is rearranged as (i) a target bid of the given time slot and the given day of the given week and (ii) a demand, a clearing price, number of bids placed by the one or more energy generators, and an actual quantity of generation cleared by a market operator for the one or more energy generators), the system 100 during the prediction of fractional bids of future day (e.g., assuming Tuesday Jun. 11, 2019, 1.00 PM is a future time slot of current day/future day), then utilizes most recent data comprising a demand, a clearing price, number of bids placed by the one or more energy generators, and an actual quantity of generation cleared by a market operator for the one or more energy generators pertaining to the same time slot say 1.00 PM of Jun. 10, 2019 (same time slot of the previous day which is Monday) and 1.00 PM of Jun. 4, 2019 (e.g., same time slot and day of the previous week which is 1.00 PM of Tuesday Jun. 4, 2019) for prediction of fractional bids.

The steps 202 till 210 and the step of estimating the actual bid of each generator together may be termed as softmax regressor technique, in the present disclosure. The above steps 210 till 210 and the step of estimating the actual bid of each generator are better understood by way of following description illustrated by way of example:
Generators with Constant Total Bid Quantity:

There is a significant set of generators where the total bid quantity (denoted compactly as TBQ) is a constant across the whole data set. This could mean these plants operate at their capacity almost always. For all such generators, the 10 targets which needs to predicted, all add up to a constant. Standard vector-valued target regressors which assume each of the scalar components in the target to be independent will not account for this constraint during training. By way of the above steps 202-210 the system 100 incorporates this constraint during training itself as follows. Instead of predicting the actual bid quantity, the system 100 predicts a normalized bid vector (normalized by the TBQ) such that the sum of all these normalized or fractional bids add up to 1. The idea of the present disclosure is to use a feedforward neural-network based regressor with a softmax output layer. The softmax output layer implements a softmax function which is a smooth approximation of the discontinuous arg max function with a one-hot representation. Formally, it takes n inputs $x=[x_1, x_2, \ldots, x_n]$ transforms it to a probability vector as follows:

$$\sigma(x)_i = \frac{e^{x_i}}{\sum_{j=1}^{n} e^{x_j}} \text{ for } i = 1, \ldots, n \quad (1)$$

It is to be noted that the discontinuous argmax function always maps any x to a degenerate probability mass vector with probability mass of 1 on the index i which is the argmax of x. The 10-output softmax function at the output layer makes sure that the outputs are all non-negative, lying between 0 and 1 and constrained to add up to 1. The present disclosure explores a feedforward structure with and without a hidden layer in this setting. It is to be further noted that the choice of a softmax function at the output layer is a standard choice for multiclass classification, while here the present disclosure has utilized for constrained regression setting. In a nutshell, usage of softmax layer is specifically used for a class of energy generators whose total bid quantity is constant, in the present disclosure. The way loss function (sum of absolute error) is utilized in the present disclosure is that the same loss is employed for all energy generators, wherein the data (information) differs from one energy generator to another energy generator.

The next important issue is with regard to the choice of the error function to meaningfully quantify the distance or closeness between the true and predicted fractional bid values. The choice of absolute relative error is ruled out here because almost all generators place zero bids in one or more of these 10 price bands. Of the many other well-known choices in the machine learning literature, systems and methods of the present disclosure chose the sum of absolute error (SAE) across the 10 components as the error or loss function between the prediction Y and the target Y'. Formally, the SAE between prediction Y and the target Y' would be $\Sigma_{i=1}^{10}|y_i'-y_i|$. The rationale for this choice comes from two reasons: (i) SAE loss seems to capture the error most meaningfully in the current context (as we argue later) (ii) there exists a neat and tight bound for the error.

SAE bound: The SAE loss between any 10 dimensional probability vectors is obviously upper bounded by 10. However, this is a very loose bound and can be substantially tightened. Specifically, we prove that SAE≤2.

$$\sum_{i=1}^{n} |y_i' - y_i| \leq \sum_{i=1}^{n} |y_i'| + \sum_{i=1}^{n} |y_i| \quad (2)$$
$$= \sum_{i=1}^{n} |y_i'| + \sum_{i=1}^{n} |y_i|$$
$$= 1 + 1 = 2$$

A choice of Y'=[10 . . . 0], Y=[00 . . . 1] yields SAE(Y',Y)=2, which immediately shows the tightness of the bound. In fact, any pair of (Y', Y) where the non-zero bids in Y and Y' are at non-overlapping bands would yield an SAE(Y', Y)=2.

Present disclosure also highlights on issues with other loss functions (e.g., Sum Squared Error (SSE), Cross Entropy (CE), and Kullback-Leibler (KL) divergence):

Sum Squared Error (SSE): Consider a prediction vector $$Y_1' = \left[\frac{1}{5}\frac{1}{5}\frac{1}{5}\frac{1}{5}\frac{1}{5}0 \ldots 0\right]$$

and a target vector $$Y_1 = \left[0 \ldots 0\frac{1}{5}\frac{1}{5}\frac{1}{5}\frac{1}{5}\frac{1}{5}\right].$$

A straight forward evaluation yields SSE=0.4 while SAE=2.

However, given that both pairs (Y', Y) and (Y'$_1$, Y$_1$) are such that the non-zero bids placed in the target and prediction vector appear in non-overlapping bands, it is reasonable to expect that a meaningful error metric should associate the same error magnitude to both these pairs. The SSE loss unfortunately assigns an error of 2 and 0.4 respectively, which are nowhere close. Hence, the SSE may not be an appropriate choice of a loss function in this scenario.

Cross Entropy: This is a natural and standard loss function employed for multi-class logistic regression based classifiers. Recall that cross entropy between Y' and Y is defined as $H(Y', Y) = -\Sigma_{i=1}^{N} y_i \log(y_i')$. In a classification context, the target vector Y is the one-hot encoding of the true label which is always a degenerate probability mass function (PMF). Under this constraint, whenever the prediction and target match (Y'=Y), then the loss H(Y', Y)=0. This is why CE makes sense for multi-class classification. In the constrained regression case, the target Y can be any PMF, in which case if Y'=Y, then H(Y',Y)=H(Y) which is the entropy of Y would be non-zero in general. Hence CE is not suitable.

KL divergence: This is another potential error metric defined as $KL(Y', Y) = -\Sigma_{i=1}^{N} y_i \log(y_i'/y_i)$. Given that it satisfies KL(Y', Y)=0 if Y=Y' i.e., the loss is zero when the prediction and target match, it seems a reasonable choice. However, consider a prediction-target pair Y'$_2$=[½½0 ... 0] and Y$_2$=[½0½0 ... 0]. From definition, it is easy to verify that KL(Y'$_2$, Y$_2$)=KL(Y$_2$, Y'$_2$)=∞. Also KL(Y'$_1$, Y$_1$)=KL(Y$_1$, Y'$_1$)=∞. This means KL cannot even though we expect these two distances/errors to be different. Hence KL divergence is also not suitable.

Figure 3:
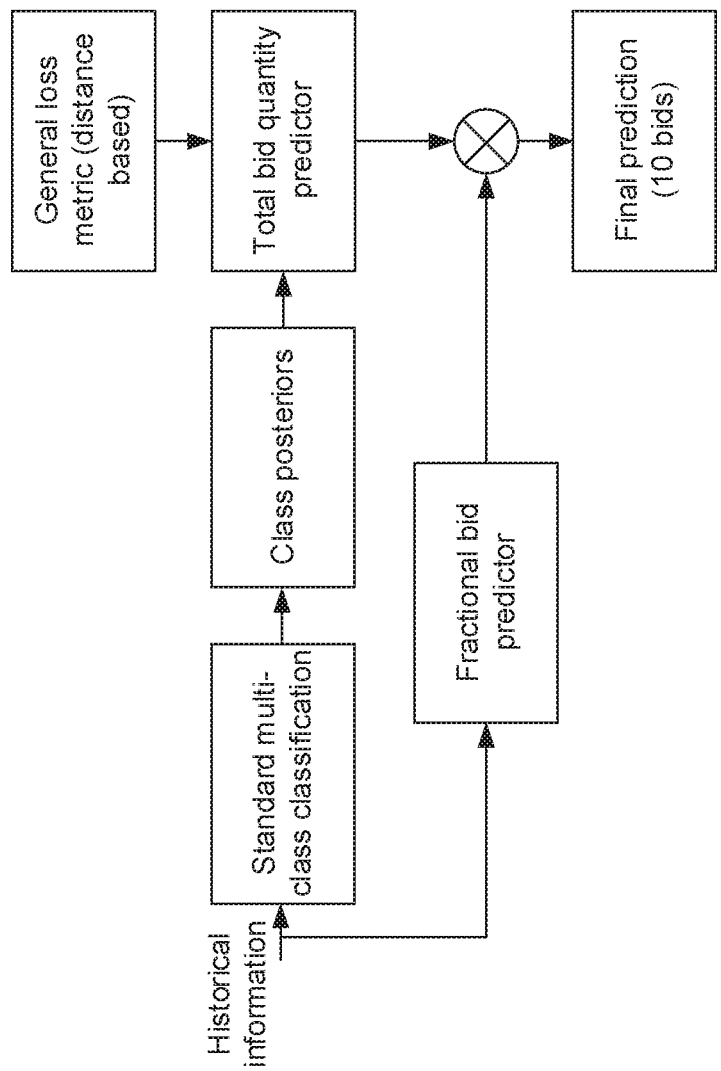
FIG. 3 depicts a flow diagram illustrating a method of predicting how the chosen bid quantity is distributed in the 'n' price bands using the system of FIG. 1 in accordance with an embodiment of the present disclosure.

Now referring to FIG. 3, FIG. 3 depicts a flow diagram illustrating a method of predicting how the chosen bid quantity is distributed in the 'n' price bands using the system 100 of FIG. 1 in accordance with an embodiment of the present disclosure. As can be seen in FIG. 3, a fractional bid predictor receives the information for prediction specific to the one or more energy generators for the given time slot of (a) a previous day, and (b) same day of a relative previous week with reference to the given day of the given week. The information is the same as mentioned above and described herein. This information is utilized by the fractional bid predictor to predict a fraction of a total bids made by each energy generator. In the present disclosure, the fractional bid predictor is comprised in the memory 102. Further, a total bid quantity is predicted by the system 100 based on (i) the information for prediction specific to the one or more energy generators for the given time slot of (a) a previous day, and (b) same day of a relative previous week with reference to the given day of the given week, and (ii) distance between a priori known total bids quantity values. For instance, the information comprises demand, a clearing price, number of bids placed by the one or more energy generators, an actual quantity of generation cleared by a market operator for the one or more energy generators, and the like. Based on the total bid quantity and the set of fractional bids (e.g., also referred as pre-computed set of fractional bids), the system 100 predicts a final set of bids. The above steps of predicting set of fractional bids, total bid quantities, and final set of bids are depicted in FIG. 3 by way an illustrative example. In the present disclosure, the final set of bids are obtained by the system by multiplying the set of fractional bids and the total bid quantities. In other words, the system 100 multiplies the set of fractional bids and the total bid quantities to obtain/predict the final set of bids. As shown above the training values of the historical information of predicted fractional bids and total bid quantities, the prediction of fractional bids and total bid quantities for test data may have similar values. For the sake of brevity, the values and/or the output of data of testing phase are not shown. However, it is to be understood by a person having ordinary skill in the art that the prediction values (e.g., fractional bids and total bid quantities and final bids) can be obtained as output during testing phase by using the most recent data for same time slot of previous day and same day of previous week which consists of same information demand, clearing price, number of bids placed by of the energy generators, and cleared quantity of the energy generators.

The above description of FIG. 3, can be better understood by way of following description:

Generators with Non-Constant TBQ:

As mentioned earlier, the historical bid logs of a substantial number of generators are such that in more than 95% of the data the TBQ values vary over a small finite set of values only. For such generators, one can explore a slightly general prediction procedure than described above for the constant TBQ case. Since the TBQs instead of being constant vary over a finite set of values, these would certainly need some prediction. And since they vary over a small set of values, posing this prediction problem as a classification problem is a natural choice. This means one can employ a 2-step procedure where in the first step the system 100 independently predicts (a) TBQ and (b) the way TBQ is distributed across the 10 bands using the softmax regressor (for instance) described above for the constant TBQ case. The second step would involve multiplying these two independent predictions to obtain the final bids.

Further, even though TBQ values predominantly range over a finite set (more than 95% of the support), a routine multi-class classification routine would view each of these finite TBQ values as discrete attributes while not factoring into consideration their magnitudes and the distance between each of them. A multi-class logistic regression for instance would learn the posterior probabilities of each class and then perform a Bayes optimal classifier based on a 0-1 loss function where each misclassification has the same weight. It is clear now that this procedure does not take into consideration either the ordering OR the distance amongst the prominent TBQ values. To factor this addition order structure in the labels, there is a class of techniques within pattern recognition which come under the heading of 'ordinal regression' as known in the art. The ordinal regression as known in the art has seen both discriminant model based (where posterior class probabilities are learnt) and discriminant function based approaches (where the classification boundary is learnt directly with no role of probabilities). In the present disclosure, in addition to an order amongst the class labels, there is also a distance between the class labels. This distance can just be difference in magnitude between the associated TBQ values. Higher the distance between the associated TBQ values of the two classes, higher the loss.

This feature of the problem can be readily incorporated into the discriminative model based approach where the neural network prediction system 100 learns the posterior probabilities as in a standard multiclass logistic regression setting. However, while predicting instead of using a 0-1 loss matrix between the class labels, the system 100 uses a general loss matrix L as depicted in FIG. 3. The $(i,j)^{th}$ element in this matrix, namely $L_{ij}$, denotes the loss incurred in predicting class j while the true class is i. In the present disclosure, $L_{ij}$ is set to $TBQ_i - TBQ_j$. This method is also referred to as cost-sensitive classification. The final prediction is now obtained by minimizing the expected loss under this more general loss matrix. The optimal decision rule is such that each new input i is assigned to a class j as follows:

$$D(x) = \underset{j}{\operatorname{argmin}} \sum_i L_{ij} p(C_i | x) \qquad (3)$$

Figure 4A:
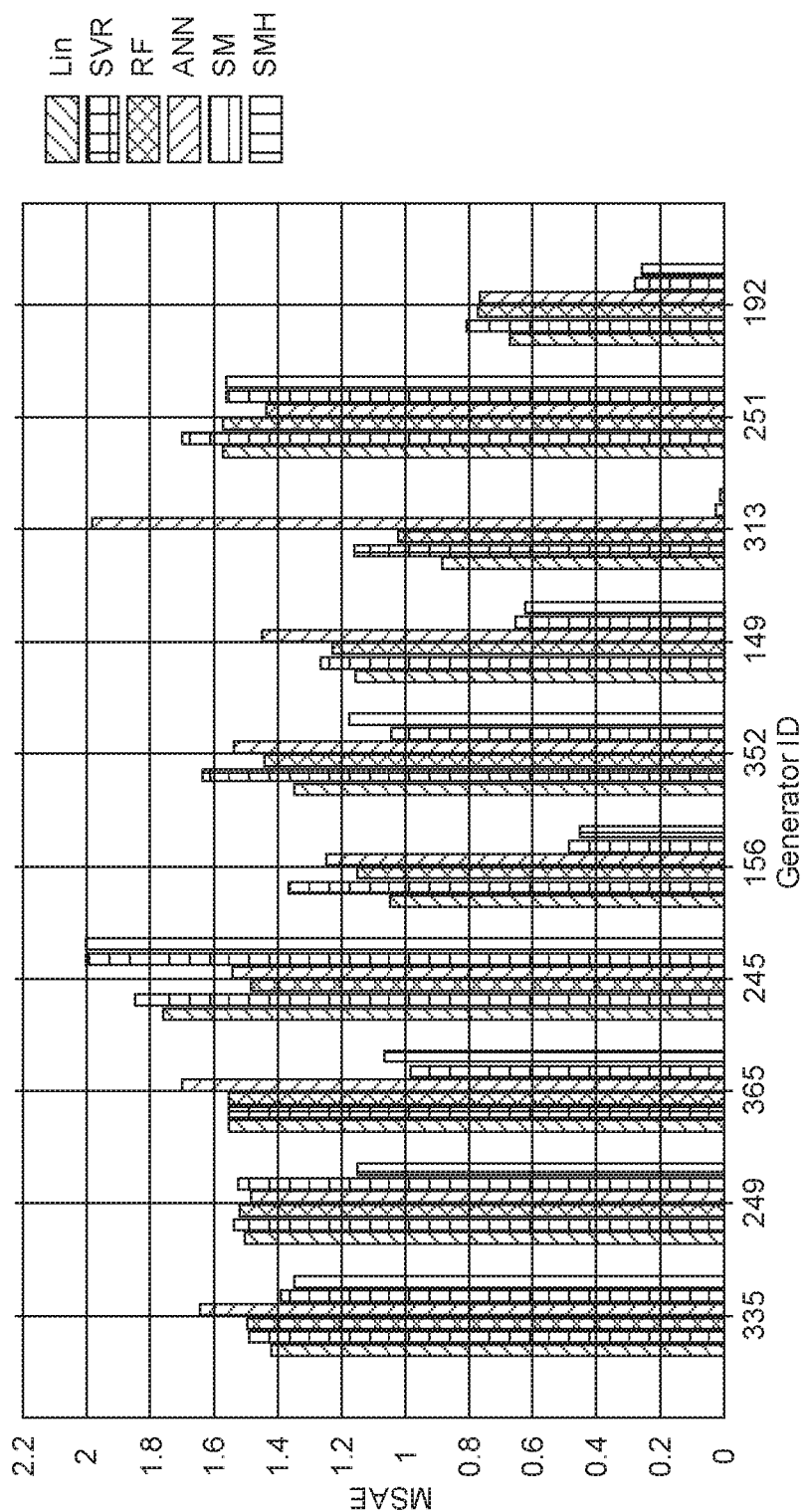
FIGS. 4A-4B depict Mean Sum Absolute Error (MSAE) comparison of softmax regressor of the present disclosure versus baseline regression approaches, in accordance with an embodiment of the present disclosure.
Figure 4B:
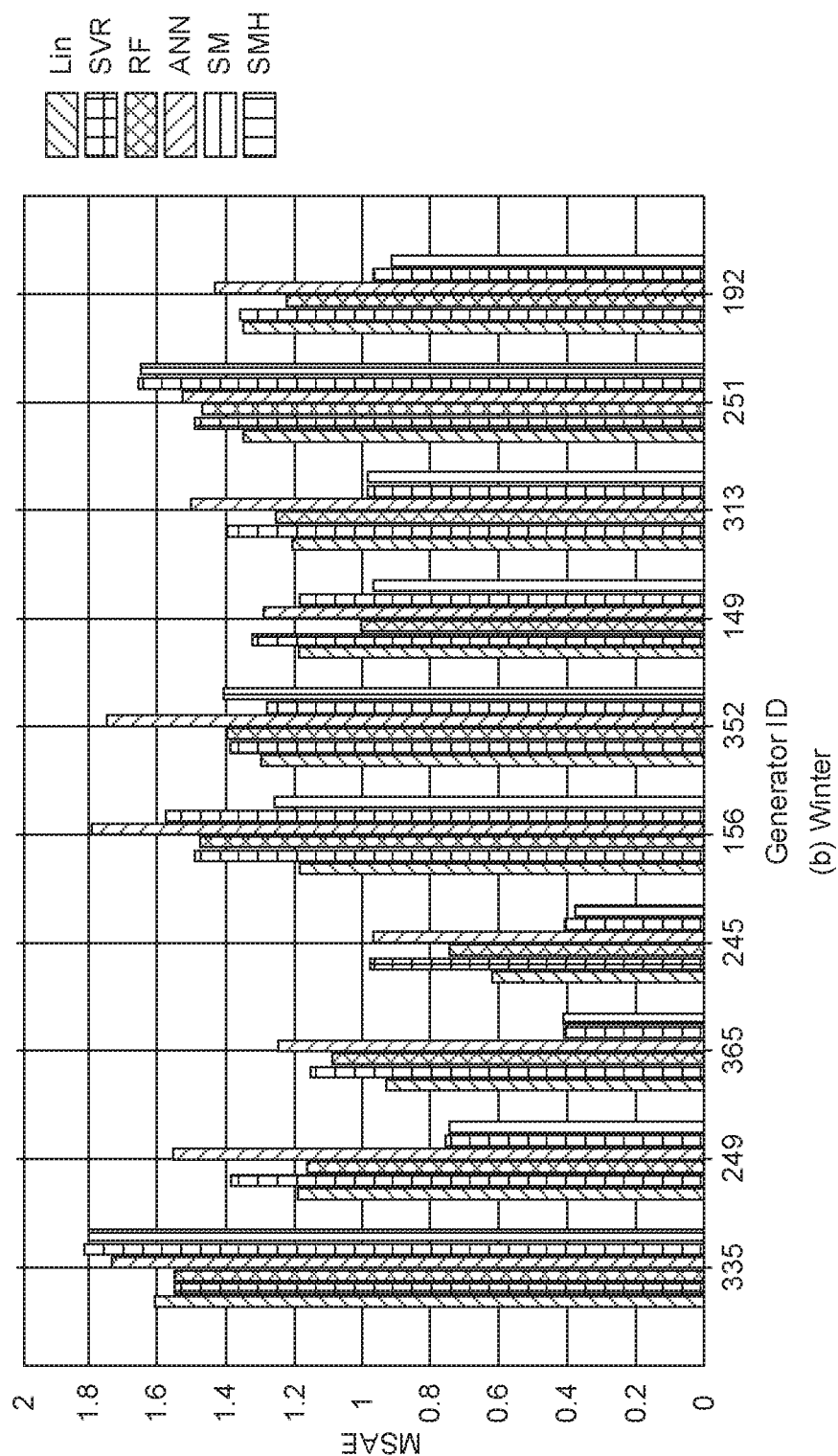

Experiments:

To demonstrate the effectiveness of softmax regressor of the present disclosure for generators with constant TBQ, performance of the method of the present disclosure has been compared with standard baseline regressors. The baselines chosen included (i) linear regression (ii) SVM (iii) Random forest (iv) feedforward ANN (with a single hidden layer). The errors are reported in terms of the Sum Absolute Error which range between 0 and 2. Note that the baseline model predictions as it is do not add up to 1 as the outputs are not constrained. The present disclosure converted the 10 outputs to a probability mass vector by an appropriate normalization. Specifically, if all the 10 components add non-negative, then the system 100 normalizes by the sum. If one or more of the components are negative, then the system adds a positive constant (equal in magnitude to the lowest value, which is negative) to the 10-dimensional vector. This makes all components non-negative, which can now be normalized as before. FIGS. 4A-4B shows the results for the top-10 generators (across the entire Australian geography) with constant TBQ which have the highest variance in the target, in accordance with an embodiment of the present disclosure. FIGS. 4A-4B show results separately for 5 months each of summer and winter, where the first 4 months were used for training while the last month served as a test set. More specifically, FIGS. 4A-4B depict Mean Sum Absolute Error (MSAE) comparison of softmax regressor of the present disclosure versus baseline regression approaches, in accordance with an embodiment of the present disclosure, wherein results are displayed on generators with the highest variance (top-10) in the target vector. To tackle potential overfitting, early stopping was employed for the softmax regressor and baseline ANN approaches. It is to be noted that SMH (softmax structure with hidden layer(s)) and SM (softmax structure without hidden layer(s)) denote the softmax regressor approaches of the present disclosure with and without hidden layers respectively.

Figure 5B:
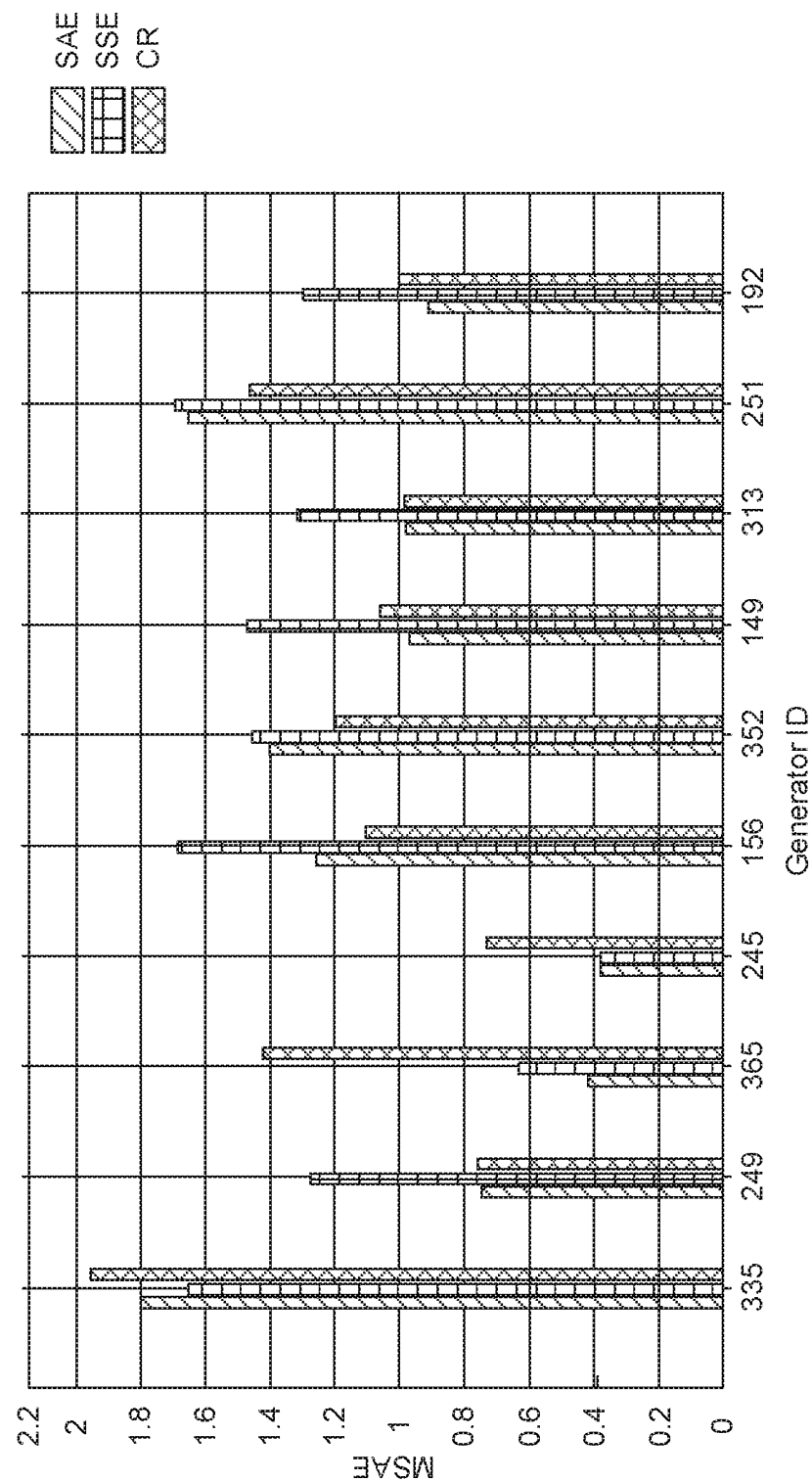

Systems and methods of the present disclosure explore training the softmax regressor under Sum squared error (SSE) and Cross Entropy (CE) loss functions in addition to the SAE loss as implemented by the system 100 and present disclosure. Performance of all the regressors under MSAE metric have been compared, both for summer and winter and is depicted in FIGS. 5A-5B. In other words, FIGS. 5A-5B, depict graphical presentations illustrating Mean Sum Absolute Error comparison of the SAE loss of the present disclosure versus Sum Squared Error (SSE) and Cross Entropy (CE), in accordance with an embodiment of the present disclosure. As evident from FIGS. 5A-5B, the results vindicate the choice of the SAE loss during training.

The present disclosure illustrates the utility of the two step prediction procedure discussed earlier for generators with non-constant TBQ. Below Table 8 enlists the Mean Absolute Error (MAE) in the target under the 2-step method of the present disclosure where the TBQ prediction employs a Loss-matrix based decision rule given by equation/expression (3). The 10 fractional bids are (preferably) obtained from the softmax regressors employed for the constant TBQ case. Table 8 shows the results for the top-10 generators which have the least variance in the normalized (or fractional) bid part of the target. Since the present disclosure requires to illustrate the utility of the Loss matrix based ordinal regressor for (a finitely varying) TBQ target case, the method of the present disclosure was illustrated on generators where the variance in the associated fractional bids was as low as possible. The MAEs marked in bold text indicate cases where the 2-step ordinal regression based method does better than 4 baseline approaches. For instance, Generator IDs and values 247-82.0335826863, 353-27.4812693814, 309-7.3630182286, 317-27.4426571552, and 360-45.7203301349.

The system 100 was trained and tested separately for summer and winter. Specifically, for each season the system was trained with 4 months of data and tested on the following one month.

TABLE 8

| Generator ID | 2-step method | LR | SVM | RF | ANN |
| --- | --- | --- | --- | --- | --- |
| 310 | 46.8220737099 | 35.9867059977 | 70.6053189279 | 60.0896551724 | 72.6345821 |
| 247 | 82.0335826863 | 82.458693838 | 112.221872504 | 110.702068965 | 96.524328 |
| 244 | 35.7264664781 | 14.8494894503 | 12.4979842969 | 17.4420689655 | 36.1648973 |
| 212 | 0 | 14.2177886472 | 24.5592103706 | 0 | 11.263584 |
| 323 | 162.145324850 | 979.85639547959 | 121.499620492 | 163.944758620 | 174.6985 |
| 170 | 42.7751260624 | 27.6324988074 | 43.3568546226 | 32.9747586207 | 45.2379465 |
| 353 | 27.4812693814 | 338583595582.4 | 35.6830307875 | 30.5296551724 | 32.4651238 |
| 309 | 7.3630182286 | 27.2078589132 | 11.4216851399 | 21.78 | 24.635174 |
| 317 | 27.4426571552 | 27.4611191304 | 27.5469250334 | 27.7173793103 | 28.463987 |
| 360 | 45.7203301349 | 77.3646695205 | 58.6833123587 | 77.1991724138 | 65.698743 |

Embodiments of the present disclosure and its systems and methods thereof utilize a constraint where the sum of the targets add up to a constant (TBQ in this case) for incorporating into the functional form of the regressor. System of the present disclosure intelligently perform this by using a softmax layer at the output of the ANN. Further, the present disclosure train the neural network 108A as implemented and executed by the system 100 with a more appropriate loss function (than a traditional mean square error loss) and rigorously reason out (refer above challenges in using other loss functions) why this choice of loss function is more appropriate than many other standard losses. Further for generators where TBQ varies across a finite set of categories, the systems and methods of the present disclosure intelligently identify the most appropriate ordinal regression technique which also exploits not just the order in the targets, but also their mutual distance (e.g., also referred as 'general loss metric' or 'distance between a priori known total bids quantity values').

In a nutshell, embodiments of the present disclosure generate the predictive models (by training the neural network 108A—refer step 204-206 of FIG. 2) which are used/executed in a simulator (e.g., implemented and executed by the system 100) where the present disclosure enables the systems and methods associated thereof to maximize or compute an optimal bidding strategy for an agent of interest. The system 100 targets this agent of interest's bidding strategy to maximize, while the simulator mimics bidding behavior of the competing energy generator. Predictive models that are built for each competing energy generator are incorporated in the simulator (e.g., simulator is comprised in the memory 102).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
receiving in a neural network, via one or more hardware processors, an input request to predict a plurality of bid quantities of one or more energy generators for a given time slot and a given day of a particular week;
obtaining, via the one or more hardware processors, historical information across a pre-defined time period corresponding to the one or more energy generators, the historical information comprising a demand, a clearing price, number of bids placed by the one or more energy generators, and an actual quantity of generation cleared by a market operator for the one or more energy generators, wherein the historical information is arranged as (i) a target bid of the given time slot and the given day of the given week and (ii) information for prediction specific to the one or more energy generators for the given time slot of (a) a previous day, and (b) same day of a relative previous week with reference to the given day of the given week, wherein the clearing price refers to a per unit price that the market operator provides to the energy generator whose bids have been cleared;
training the neural network, via the one or more hardware processors, using (i) a feedforward structure with softmax output layer, (ii) the rearranged historical information, and (iii) a sum absolute error loss employed with the one or more energy generators, to obtain a learnt set of weights, wherein the feedforward structure is explored with and without hidden layers with a 10-output softmax function at an output layer ensures that outputs are all non-negative lying between 0 and 1, and constrained to add up to 1, wherein the usage of softmax output layer is used for a class of generators whose bid quantity is constant, wherein the sum of absolute error is utilized such that same loss is employed for all energy generators in which the information differs from one energy generator to another energy generator, wherein the sum of absolute error value is proven to be less than and equal to 2;

receiving, via the one or more hardware processors, for prediction of bid quantity of one or more energy generators, most recent data pertaining to the given time slot of the given day of the particular week, wherein the most recent data comprises demand, clearing price, number of bids placed by of the one or more energy generators, and cleared quantity of the one or more energy generators;

applying, via the one or more hardware processors, the learnt set of weights on the most recent data to predict a set of fractional bids associated with the one or more energy generators for the given time slot of the given day of the particular week, wherein the fractional bids refer to bids distributed among a plurality of price bands; and predicting a normalized bid vector, instead of predicting an actual bid quantity, such that the sum of all normalized or the set of fractional bids add up to 1 and learning posterior probabilities as in a multiclass logistic regression setting, further uses a general loss matrix $L_{ij}$, instead of using a 0-1 loss matrix between class labels, where $(i, j)^{th}$ element denotes loss incurred in predicting class 'j' while true class is 'i', and a final prediction is obtained by minimizing expected loss under the general loss matrix.

2. The processor implemented method of claim 1, wherein the sum absolute error loss is obtained based on (i) a target bid of the given day of the particular week by each of the one or more energy generators and (ii) an output generated by the neural network, and wherein the output is based on a current configuration of the neural network and one or more weights assigned to one or more layers in the neural network.

3. The processor implemented method of claim 1, further comprising receiving, via a fractional bid predictor, the information for prediction specific to the one or more energy generators for the given time slot of (a) a previous day, and (b) same day of a relative previous week with reference to the given day of the given week, for predicting a fraction of a total bids made by each energy generator.

4. The processor implemented method of claim 1, further comprising estimating an actual bid of each of the one or more energy generators based on the set of fractional bids and a total bid quantity associated with each corresponding energy generator.

5. The processor implemented method of claim 4, further comprising predicting a total bid quantity based on (i) the information for prediction specific to the one or more energy generators for the given time slot of (a) a previous day, and (b) same day of a relative previous week with reference to the given day of the given week, and (ii) distance between a priori known total bids quantity values.

6. The processor implemented method of claim 5, further comprising predicting a final set of bids based on the set of fractional bids and the total bid quantity.

7. A system, comprising:
a memory storing instructions;
one or more communication interfaces; and
one or more hardware processors coupled to the memory via the one or more communication interfaces, wherein the one or more hardware processors are configured by the instructions to:

process in a neural network, an input request to predict a plurality of bid quantities of one or more energy generators for a given time slot and a given day of a particular week;

obtain historical information across a pre-defined time period corresponding to the one or more energy generators, the historical information comprising a demand, a clearing price, number of bids placed by the one or more energy generators, and an actual quantity of generation cleared by a market operator for the one or more energy generators, wherein the historical information is arranged as (i) a target bid of the given time slot and the given day of the given week and (ii) information for prediction specific to the one or more energy generators for the given time slot of (a) a previous day, and (b) same day of a relative previous week with reference to the given day of the given week, wherein the clearing price refers to a per unit price that the market operator provides to the energy generator whose bids have been cleared;

train the neural network using (i) a feedforward structure with softmax output layer of the neural network, (ii) the rearranged historical information, and (iii) a sum absolute error loss employed with the one or more energy generators, to obtain a learnt set of weights, wherein the feedforward structure is explored with and without hidden layers with a 10-output softmax function at an output layer ensures that outputs are all non-negative lying between 0 and 1, and constrained to add up to 1, wherein the usage of softmax output layer is used for a class of generators whose bid quantity is constant, wherein the sum of absolute error is utilized such that same loss is employed for all energy generators in which the information differs from one energy generator to another energy generator, wherein the sum of absolute error value is proven to be less than and equal to 2;

receive for prediction of bid quantity of one or more energy generators, most recent data pertaining to the given time slot of the given day of the particular week, wherein the most recent data comprises demand, clearing price, number of bids placed by of the one or more energy generators, and cleared quantity of the one or more energy generators;

apply the learnt set of weights on the most recent data to predict a set of fractional bids associated with the one or more energy generators for the given time slot of the given day of the particular week, wherein the fractional bids refer to bids distributed among a plurality of price bands; and predict a normalized bid vector, instead of predicting an actual bid quantity, such that the sum of all normalized or the set of fractional bids add up to 1 and learns posterior probabilities as in a multiclass logistic regression setting, further uses a general loss matrix $L_{ij}$, instead of using a 0-1 loss matrix between class labels, where $(i, j)^{th}$ element denotes loss incurred in predicting class 'j' while true class is 'i', and a final prediction is obtained by minimizing expected loss under the general loss matrix.

8. The system of claim 7, wherein the sum absolute error loss is obtained based on (i) a target bid of the given day of the particular week by each of the one or more energy generators and (ii) an output generated by the neural network, and wherein the output is based on a current configuration of the neural network and one or more weights assigned to one or more layers in the neural network.

9. The system of claim 7, wherein the one or more hardware processors are further configured by the instructions to receive, via a fractional bid predictor comprised in the memory (102), the information for prediction specific to the one or more energy generators for the given time slot of (a) a previous day, and (b) same day of a relative previous week with reference to the given day of the given week, for predicting a fraction of a total bids made by each energy generator.

10. The system of claim 7, wherein the one or more hardware processors are further configured by the instructions to estimate an actual bid of each of the one or more energy generators based on the set of fractional bids and a total bid quantity associated with each corresponding energy generator.

11. The system of claim 10, wherein the one or more hardware processors are further configured by the instructions to predict a total bid quantity based on (i) the information for prediction specific to the one or more energy generators for the given time slot of (a) a previous day, and (b) same day of a relative previous week with reference to the given day of the given week, and (ii) distance between a priori known total bids quantity values.

12. The system of claim 11, wherein the one or more hardware processors are further configured by the instructions to predict a final set of bids based on the set of fractional bids and the total bid quantity.

13. One or more non-transitory machine readable information storage mediums comprising one or more instructions which when executed by one or more hardware processors cause predicting competition behavior in energy markets by:
    receiving in a neural network, via one or more hardware processors, an input request to predict a plurality of bid quantities of one or more energy generators for a given time slot and a given day of a particular week;
    obtaining, via the one or more hardware processors, historical information across a pre-defined time period corresponding to the one or more energy generators, the historical information comprising a demand, a clearing price, number of bids placed by the one or more energy generators, and an actual quantity of generation cleared by a market operator for the one or more energy generators, wherein the historical information is arranged as (i) a target bid of the given time slot and the given day of the given week and (ii) information for prediction specific to the one or more energy generators for the given time slot of (a) a previous day, and (b) same day of a relative previous week with reference to the given day of the given week, wherein the clearing price refers to a per unit price that the market operator provides to the energy generator whose bids have been cleared;
    training the neural network, via the one or more hardware processors, using (i) a feedforward structure with softmax output layer, (ii) the rearranged historical information, and (iii) a sum absolute error loss employed with the one or more energy generators, to obtain a learnt set of weights, wherein the feedforward structure is explored with and without hidden layers with a 10-output softmax function at an output layer ensures that outputs are all non-negative lying between 0 and 1, and constrained to add up to 1, wherein the usage of softmax output layer is used for a class of generators whose bid quantity is constant, wherein the sum of absolute error is utilized such that same loss is employed for all energy generators in which the information differs from one energy generator to another energy generator, wherein the sum of absolute error value is proven to be less than and equal to 2;
    receiving, via the one or more hardware processors, for prediction of bid quantity of one or more energy generators, most recent data pertaining to the given time slot of the given day of the particular week, wherein the most recent data comprises demand, clearing price, number of bids placed by of the one or more energy generators, and cleared quantity of the one or more energy generators;
    applying the learnt set of weights on the most recent data to predict a set of fractional bids associated with the one or more energy generators for the given time slot of the given day of the particular week, wherein the fractional bids refer to bids distributed among a plurality of price bands; and
    predicting a normalized bid vector, instead of predicting an actual bid quantity, such that the sum of all normalized or the set of fractional bids add up to 1 and learning posterior probabilities as in a multiclass logistic regression setting, further uses a general loss matrix $L_{ij}$, instead of using a 0-1 loss matrix between class labels, where $(i, j)^{th}$ element denotes loss incurred in predicting class 'j' while true class is 'i', and a final prediction is obtained by minimizing expected loss under the general loss matrix.

14. The one or more non-transitory machine readable information storage mediums of claim 13, wherein the sum absolute error loss is obtained based on (i) a target bid of the given day of the particular week by each of the one or more energy generators and (ii) an output generated by the neural network, and wherein the output is based on a current configuration of the neural network and one or more weights assigned to one or more layers in the neural network.

15. The one or more non-transitory machine readable information storage mediums of claim 13, wherein the one or more instructions which when executed by the one or more hardware processors further cause receiving, via a fractional bid predictor, the information for prediction specific to the one or more energy generators for the given time slot of (a) a previous day, and (b) same day of a relative previous week with reference to the given day of the given week, for predicting a fraction of a total bids made by each energy generator.

16. The one or more non-transitory machine readable information storage mediums of claim 13, wherein the one or more instructions which when executed by the one or more hardware processors further cause estimating an actual bid of each of the one or more energy generators based on the set of fractional bids and a total bid quantity associated with each corresponding energy generator.

17. The one or more non-transitory machine readable information storage mediums of claim 16, wherein the one or more instructions which when executed by the one or more hardware processors further cause predicting a total bid quantity based on (i) the information for prediction specific to the one or more energy generators for the given time slot of (a) a previous day, and (b) same day of a relative previous week with reference to the given day of the given week, and (ii) distance between a priori known total bids quantity values.

18. The one or more non-transitory machine readable information storage mediums of claim 17, wherein the one or more instructions which when executed by the one or more hardware processors further cause predicting a final set of bids based on the set of fractional bids and the total bid quantity.

* * * * *